United States Patent
Heatley et al.

(10) Patent No.: US 8,587,327 B2
(45) Date of Patent: Nov. 19, 2013

(54) CABLE INSTALLATION USING INDUCTION

(75) Inventors: David John Taylor Heatley, Felixstowe (GB); Philip Alfred Barker, Ipswich (GB); Ian Neild, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 500 days.

(21) Appl. No.: 12/810,731

(22) PCT Filed: Dec. 23, 2008

(86) PCT No.: PCT/GB2008/004277
§ 371 (c)(1),
(2), (4) Date: Sep. 21, 2010

(87) PCT Pub. No.: WO2009/083718
PCT Pub. Date: Jul. 9, 2009

(65) Prior Publication Data
US 2011/0006786 A1    Jan. 13, 2011

(30) Foreign Application Priority Data

Dec. 28, 2007    (EP) ..................................... 07255067

(51) Int. Cl.
*G01R 27/28* (2006.01)

(52) U.S. Cl.
USPC ........... 324/656; 324/654; 324/655; 324/657; 324/658; 324/659; 324/660; 324/662; 324/663; 324/689; 324/690; 324/692; 324/694; 324/696; 324/698; 324/700; 324/724; 324/722; 324/720; 324/718

(58) Field of Classification Search
USPC .................................. 324/654–724
See application file for complete search history.

(56) References Cited

U.S. PATENT DOCUMENTS

| 3,814,935 A | 6/1974 | Kissel |
| 4,357,918 A | 11/1982 | Asano |

(Continued)

FOREIGN PATENT DOCUMENTS

| DE | 4202147 | 7/1993 |
| DE | 10338950 | 6/2005 |

(Continued)

OTHER PUBLICATIONS

"Draft Recommended Practices for Cable Installation in Generating Stations and Industrial Facilities", IEEE Std P1185, Jan. 2010, pp. 1-94.*

(Continued)

*Primary Examiner* — Arleen M Vazquez
*Assistant Examiner* — Lamarr Brown
(74) *Attorney, Agent, or Firm* — Patterson Thuente Pedersen, P.A.

(57) ABSTRACT

A device for use with a conduit having a first conduit end and a conduit second end, into which conduit a cable can be installed using a flow of air into the first conduit end, the device being suitable for confirming that the air is flowing out from the second conduit end. In an embodiment, the device includes a housing, means to enable connection of the device to the second conduit end, a detector arranged to detect an electrical property change, and an actuator for causing an electrical property change detectable by the detector, wherein in use, the air flowing into the device causes the detector and the actuator to move relative to each other, causing an electrical property change detectable by the detector.

24 Claims, 3 Drawing Sheets

(56) References Cited

U.S. PATENT DOCUMENTS

| | | | |
|---|---|---|---|
| 4,471,651 A | 9/1984 | Dimeff et al. | |
| 4,856,937 A | 8/1989 | Grocott et al. | |
| 4,880,484 A | 11/1989 | Obermeier et al. | |
| 4,948,219 A | 8/1990 | Seino et al. | |
| 5,002,090 A | 3/1991 | Ichikawa et al. | |
| 5,121,644 A | 6/1992 | Grey et al. | |
| 5,143,353 A | 9/1992 | Sano et al. | |
| 5,199,689 A | 4/1993 | Proud et al. | |
| 5,211,377 A | 5/1993 | Griffioen et al. | |
| 5,248,128 A | 9/1993 | Warren et al. | |
| 5,467,968 A | 11/1995 | Proud et al. | |
| 5,699,996 A | 12/1997 | Boyle et al. | |
| 5,813,658 A | 9/1998 | Kaminski et al. | |
| 5,835,657 A | 11/1998 | Suarez et al. | |
| 5,953,475 A | 9/1999 | Beier et al. | |
| 6,129,341 A | 10/2000 | Griffioen et al. | |
| 6,311,953 B1 | 11/2001 | Lang et al. | |
| 6,328,283 B1 | 12/2001 | Reeve et al. | |
| 6,364,290 B1 | 4/2002 | Barker | |
| 6,418,264 B1 | 7/2002 | Hough et al. | |
| 6,480,635 B1 | 11/2002 | Russell et al. | |
| 6,631,884 B2 | 10/2003 | Griffioen et al. | |
| 6,694,085 B2 | 2/2004 | Bergqvist et al. | |
| 6,937,033 B2* | 8/2005 | Boronkay et al. | 324/714 |
| 6,992,580 B2 | 1/2006 | Kotzin et al. | |
| 7,021,426 B2 | 4/2006 | Griffioen et al. | |
| 7,064,559 B2* | 6/2006 | Bissonnette et al. | 324/662 |
| 7,209,028 B2* | 4/2007 | Boronkay et al. | 338/205 |
| 7,225,533 B2 | 6/2007 | Sylvia et al. | |
| 7,408,474 B2 | 8/2008 | Frazier et al. | |
| 7,562,861 B2 | 7/2009 | Fee et al. | |
| 7,942,382 B2 | 5/2011 | Lecoq et al. | |
| 8,117,923 B2* | 2/2012 | Sasaki | 73/862.49 |
| 8,275,227 B2* | 9/2012 | Thurlow et al. | 385/134 |
| 8,276,883 B2* | 10/2012 | Heatley et al. | 254/134.3 R |
| 8,350,581 B1* | 1/2013 | Brady et al. | 324/658 |
| 2002/0034365 A1 | 3/2002 | Vogelsang | |
| 2002/0121440 A1* | 9/2002 | Morris | 204/421 |
| 2002/0158239 A1 | 10/2002 | Griffioen et al. | |
| 2003/0001592 A1* | 1/2003 | Boronkay et al. | 324/699 |
| 2003/0006669 A1* | 1/2003 | Pei et al. | 310/309 |
| 2003/0222663 A1* | 12/2003 | Acosta-Geraldino et al. | 324/694 |
| 2004/0135588 A1* | 7/2004 | Bissonnette et al. | 324/662 |
| 2005/0073327 A1* | 4/2005 | Walcott | 324/720 |
| 2006/0219992 A1 | 10/2006 | Fee et al. | |
| 2006/0275008 A1 | 12/2006 | Xin | |
| 2007/0047894 A1 | 3/2007 | Holmberg et al. | |
| 2007/0104447 A1 | 5/2007 | Allen | |
| 2008/0011990 A1 | 1/2008 | Kostet et al. | |
| 2008/0013893 A1 | 1/2008 | Zheng et al. | |
| 2008/0050083 A1 | 2/2008 | Frazier et al. | |
| 2008/0267714 A1 | 10/2008 | Lecoq et al. | |
| 2009/0007640 A1* | 1/2009 | Heatley et al. | 73/49.5 |
| 2009/0010606 A1* | 1/2009 | Thurlow et al. | 385/134 |
| 2009/0026429 A1 | 1/2009 | Barker et al. | |
| 2009/0065547 A1* | 3/2009 | Heatley et al. | 226/97.1 |
| 2009/0065753 A1 | 3/2009 | Gonen et al. | |
| 2009/0166597 A1 | 7/2009 | Weaver et al. | |
| 2010/0029846 A1* | 2/2010 | Shibutani et al. | 524/801 |
| 2010/0148138 A1* | 6/2010 | Baker et al. | 254/134.3 R |
| 2010/0155681 A1 | 6/2010 | Taylor et al. | |
| 2011/0062973 A1* | 3/2011 | Paterson | 324/693 |
| 2011/0079027 A1* | 4/2011 | Ghan et al. | 62/80 |
| 2011/0084244 A1* | 4/2011 | Heatley et al. | 254/134.4 |
| 2011/0135267 A1* | 6/2011 | Barker et al. | 385/135 |
| 2011/0178713 A1* | 7/2011 | Barker et al. | 702/12 |
| 2012/0023723 A1* | 2/2012 | Barker et al. | 29/407.05 |
| 2012/0029846 A1 | 2/2012 | Heatley et al. | |
| 2013/0011110 A1 | 1/2013 | Kerry et al. | |

FOREIGN PATENT DOCUMENTS

| | | |
|---|---|---|
| EP | 108590 | 5/1983 |
| EP | 253636 | 1/1988 |
| EP | 0292037 | 11/1988 |
| EP | 0294243 | 12/1988 |
| EP | 0319194 | 6/1989 |
| EP | 1273902 | 1/2003 |
| EP | 1333303 | 8/2003 |
| EP | 1593994 | 11/2005 |
| EP | 1022569 A | 7/2007 |
| EP | 1832903 | 9/2007 |
| EP | 1832908 | 9/2007 |
| EP | 1843181 A | 10/2007 |
| FR | 2737053 | 1/1997 |
| FR | 2872299 | 12/2005 |
| GB | 2073440 | 10/1981 |
| GB | 2219662 A | 12/1989 |
| GB | 2316496 | 2/1998 |
| GB | 2388966 | 11/2003 |
| JP | 4240806 | 8/1992 |
| JP | 5-328559 | 12/1993 |
| JP | 08163737 | 6/1996 |
| JP | 408178722 | 7/1996 |
| JP | 2000217216 | 8/2000 |
| SU | 1000750 | 2/1983 |
| WO | WO 88/00713 | 1/1988 |
| WO | WO 91/03756 | 3/1991 |
| WO | WO95/23988 | 9/1995 |
| WO | WO 98/12588 | 3/1998 |
| WO | WO99/12066 | 3/1999 |
| WO | WO 2006/103419 | 10/2006 |
| WO | WO2006/103424 | 10/2006 |
| WO | WO2007/101975 | 9/2007 |
| WO | WO 2007104910 A1 * | 9/2007 |
| WO | WO2007104913 | 9/2007 |
| WO | WO2009083715 | 9/2007 |
| WO | WO 2007/113544 | 10/2007 |
| WO | WO2007/113549 | 10/2007 |
| WO | WO 2007113519 A1 * | 10/2007 |
| WO | WO 2007113549 A1 * | 10/2007 |
| WO | WO2008/119976 | 10/2008 |
| WO | WO2009/083722 | 7/2009 |
| WO | WO2009083721 | 7/2009 |
| WO | WO2009/131895 | 10/2009 |
| WO | WO2010004288 | 1/2010 |
| WO | WO2010034970 | 4/2010 |

OTHER PUBLICATIONS

"IEEE Guide for the Design and Installation of Cable Systems in Substations", IEEE Std 525, Apr. 2008, pp. 1-132.*

International Search Report for International Application No. PCT/GB2007/003811 mailed Jan. 11, 2008.

International Search Report for International Application No. PCT/GB2010/000487 dated Jul. 15, 2010.

Application and File History for U.S. Appl. No. 12/445,844, filed Apr. 16, 2009, inventors Taylor et al.

Application and File History for U.S. Appl. No. 12/810,737, filed Dec. 21, 2010, inventors Heatley et al.

Application and File History for U.S. Appl. No. 13/120,124, filed Mar. 21, 2011, inventor Barker.

Application and File History for U.S. Appl. No. 13/260,105, filed Sep. 23, 2011, inventors Barker et al.

International Search Report for International Application No. PCT/GB2008/004281 dated May 28, 2009.

International Search Report for International Application No. PCT/GB2009/002222 dated Feb. 4, 2010.

International Search Report for International Application No. PCT/GB2010/000635 dated May 6, 2011.

(56) References Cited

OTHER PUBLICATIONS

International Search Report and Written Opinion for International Application No. PCT/GB2011/000432 dated Jun. 29, 2011.
Fist-GC02-F, Flat FIST generic closure organizer, Tyco Electronics Raychem, Belgium, as available on Sep. 26, 2012, at http://www.te.com/content/dam/te/global/english/industries/telecom-emea/products/documents/fiber-closures/TC-1032-DS-5-09-11.pdf.
Application and File History for U.S. Appl. No. 13/637,613, filed Sep. 26, 2012, inventors Kerry et al.
Application and File History for U.S. Appl. No. 12/281,384, filed Sep. 2, 2008, inventors Thurlow et al.
Application and File History for U.S. Appl. No. 12/295,750, filed Oct. 2, 2008, inventors Baker et al.
International Search Report for International Application No. PCT/GB2007/000455 mailed Mar. 28, 2007.
International Search Report for International Application No. PCT/G82007/001216 mailed Jul. 19, 2007.
Application and File History for U.S. Appl. No. 13/257,440, filed Sep. 19, 2011, inventors Heatley et al.

* cited by examiner

CABLE INSTALLATION USING INDUCTION

RELATED APPLICATIONS

This application is a National Phase entry of PCT Application No. PCT/GB2008/004277, filed Dec. 23, 2008, which claims priority to European Patent Application No. 07255067.6, filed Dec. 28, 2007, the disclosures of which are hereby incorporated herein by reference in their entireties.

TECHNICAL FIELD

The invention relates to the installation of cables, such as optical fiber units, wires, electrical cables or the like. More specifically, but not exclusively, the invention relates to the blowing of fiber unit cables through pre-laid conduits.

BACKGROUND

Optical fibers are widely used within telecommunication systems for high-speed information transfer, particularly in the core or backbone network. With the advent of fiber to the premises (FTTP), the conduits will further extend to and into commercial and residential premises. Indeed it is a fundamental part of the push to FTTP in e.g. the UK, that substantially all the network comprises optical fiber, extending from the core network to as many end customers, both commercial and residential, as possible. This involves the installation of millions of kilometers of optical fiber across the network, especially at the local access level which had previously been served by copper. To achieve widespread take-up, the optical fiber installation process needs to be speedy, cost- and effort-efficient.

An optical fiber unit, which could comprise a single optical fiber, or a bound bundle of typically 2 to 24 optical fiber, can be installed using what is known as the "blown fiber" method, described in EP108590. In this method, a fiber unit is propagated along a hollow tube pre-laid along the desired route, where compressed air is fed, or "blown" into the mouth of the tube. The viscosity of the flow of air travelling along inside the tube, together with the friction on the outer surface of the fiber unit, help to carry the fiber unit along the length of the tube.

The tubes or conduits typically are made of plastic, each with a typical inner diameter of 2.5 to 6 mm or more, and are usually provided in a bound bundle comprising up to 24 or more tubes, which are held together within a protective outer sheath. The tubes usually comprise a continuous span between convenient access points such as surface boxes, inspection chambers down man holes, or near telephone poles. Each fiber conduit tube can receive at least one fiber unit comprising one or more individual optical fibers. Large numbers of tube conduits—and bundles of conduits—are pre-installed across the access network and the distribution network between the local exchanges and the customer premises, typically to locations which may require a future fiber connection.

When it is decided to populate these pre-installed tubes, the fiber cable or unit is installed in each tubular span by blowing it down the conduit from one end; alternatively the unit could be blown down a concatenation of spans in a single step if circumstances permit. This is repeated for each span, or concatenation of spans, until a continuous fiber path has been laid between the end points of the whole route.

A tubular path can be described between two access points, which may be hundreds of meters apart, by a single length of conduit tube. The conduit path may alternatively comprise a number of lengths of physically separate conduit tubes which are connected together e.g. in series. Either way, it is crucial to choose the correct conduit path during installation, so that the fiber unit emerges at the desired destination end. During installation however, the operator at one of the installation points would be presented with a large and potentially confusing number of conduit tube openings, each representing a path leading to a destination. The tube openings are usually mapped to their destinations e.g. by color-coding. If however the tube openings are wrongly mapped, or the records otherwise inaccurate, mistakes can be in made in attempts to identifying the conduit path and the tube opening leading to the desired destination. This is especially so if the working conditions are poor e.g. in adverse weather up a telephone pole or down a manhole or in poor lighting.

Where the path comprises a number of tube lengths connectorized together, yet another problem may lie in broken connections between lengths of conduit tubes within the network, so that the fiber unit may get lost within the system during installation and never emerge at the destination. Yet another issue may be the possibility that the fiber unit, during installation, could be impeded by an imperfect connection or a tight bend or some other source of friction in the conduit, and again never emerge at the destination.

For any of these or other reasons, the fiber unit may, during installation, emerge in the wrong place, or in an extreme case, not at all. Add to that some uncertainty about the exact length of the conduit route down which the fiber unit is being installed, so that the operator may not even know in a timely manner when something has gone wrong.

The current response to this problem is to use two operators during installation, one at each end of the installation conduit path. The second operator at the destination end of the tubular path is required because the destination or remote end is often some distance away—up to a kilometer or more—from the head end. The operator at the head end is therefore unable to know the status of the remote end during an installation without a second operator located there reporting the status back to the head end.

During a typical installation session, the first operator situated at the head end of the conduit fits a protective slug or bead on the tip of the fiber unit, then feeds this and compressed air into the mouth of the conduit with fiber installation apparatus—known in the art as a "blowing head" which is described in general in WO88/00713. Meanwhile the second operator locates himself at the desired end point of the fiber installation. The process commences by directing compressed air into the mouth of the head end conduit. If the air is directed into the correct conduit so that the tubular path leads to the desired destination, the remote end operator can eventually sense the arrival of the air with an air flow meter temporarily connected to the end of the conduit, or more simply by feeling the air flow exiting the conduit against his hand if the air flow is sufficiently high. He then communicates this to the head end operator by radio or other means, to confirm to the head end operator that the air is applied to the correct conduit. The head end operator upon receiving the news, then blows the fiber unit into the conduit through to the remote end, whereupon the remote end operator advises his colleague on its arrival. The head end operator then turns off the air supply and the blowing head, and the installation process is complete.

This process is labor-intensive as two operators must work on a single installation.

This is in turn drives up the overall cost of optical fiber installation, a problem now especially significant in the FTTP context with the considerable installation volumes involved.

Various methods requiring only a single operator installation of blown fiber have been developed, to obtain a significant saving in manpower and cost requirements. In the simplest method, the length of the conduit route is known, allowing the operator to know that the fiber has (probably) arrived at the remote end when the required length of fiber unit has been played out. This relies on the map record of conduit route being up to date and accurate, and presumes a completely smooth and obstruction-free conduit route. Neither of these can be guaranteed in practice.

Another known practice is to install at the remote end of the conduit a barrier of porous material such as an "airstone" which is constructed of a porous material which allows air through but which will stop further progress of the fiber unit. The airstone is temporarily placed at the mouth of the destination remote end of the tube conduit. When the fiber ceases to travel down the tube, this is an indication that the far end of the fiber may have reached the destination end and has been retained by the airstone barrier. However, lack of further progress is ambiguous as to whether the fiber unit has indeed reached the porous airstone at the destination end, or if instead the fiber unit is caught on an obstruction at some intermediate point along the length of the conduit.

These, together with other methods like those described in WO 91/03756 or WO 98/12588, also describe how fiber arrival can be detected by the single operator at the head end of the installation; the initial step of detecting that the compressed air fed into the head tube end is not addressed in the above techniques.

WO 2007/113544, the applicant's co-pending application, describes a method for detecting the emergence of the leading end of the fiber unit from the remote end of the conduit, by sensing the metallic property of the bead which marks the following of the rest of the fiber unit. However this does not include the sensing of airflow, only of the fiber unit. The operator would have to employ a different method (e.g. by stationing the second operator at the remote end) to confirm that air has been applied down the correct conduit, before the fiber unit is installed into the conduit.

A method developed by the applicant covered in WO 2006/103419 does describe a device which permits the detection of the arrival of both air as well as the remote end of the fiber unit at the opening of the remote tube end. The device uses a low-mass wind vane which rotates in the presence of air flow, and which rotation is stopped when the fiber end arrives and gets "caught" in the blades of the wind vane. The change in status of the wind vane can be captured as indicia of air or fiber arrival.

SUMMARY

In general, embodiments of the invention provide methods and devices relating to the installation of cables such as optical fiber units into conduit tubes using e.g. the blown fiber method, so that, a single operator can operate substantially on his own at one end, to determine if compressed air and/or the fiber unit fed into a conduit has reached its intended destination. Embodiments can be used where the operator has to choose between one of a number of conduits, or where there is a single conduit but where it is desirable to unambiguously confirm that the air and/or the fiber unit will reach or reaches the intended destination. In view of the possible volumes that may be deployed in FTTP initiatives, embodiments also address the need for cost-efficiency in being relatively cheap to manufacture and simple to operate.

In an embodiment, a device is provided, for use with a conduit having a first conduit end and a conduit second end, into which conduit a cable can be installed using a flow of air into the first conduit end, the device being suitable for confirming that the air is flowing out from the second conduit end, the device comprising a housing,—means to enable connection of the device to the second conduit end, a detector arranged to detect an electrical property change, and an actuator for causing an electrical property change detectable by the detector, wherein in use, the air flowing into the device causes the detector and the actuator to move relative to each other, causing an electrical property change detectable by the detector.

The actuator comprises a component having a metallic or other property which changes an electric property of the detector, such as its inductance. Other measurable electrical properties or characteristics can also be used, such as the detector's capacitance, its Q factor, resistance, or the like. Preferably however, the inductance change is used for being easily measured. If inductance change is the measured property, the detector may take the form of e.g. an induction coil being part of an oscillator circuit. The actuator which has a metallic property, is arranged to be able to move in and out of the immediate vicinity of the detector; in particular the actuator can take two specific positions relative to the detector which clearly change the frequency tone of the oscillator, which is conveyed to the operator at the head end that a change has taken place i.e. that the air has arrived at the far end.

In embodiments, the device is configured also to detect arrival of the optical fiber which is sent down the conduit into which the compressed air is pumped, after confirmation of an air flow at the remote end is received by way of e.g. a radio frequency communication or other communication means. The detection of the arrival of, specifically the protective metallic bead which is crimped onto the end of the fiber unit, is also obtained by an inductance change resulting from the presence of the bead near the detector at the far end.

Embodiments further include means to keep or hold the actuator in one of either a "resting" or an "activated" position. The installation session starts with the device in the rest position, and it is activated by the flow of air into the device housing during the initial step of confirming that air is flowing out of the desired tube. The change of position to the second position causes an air vent to open within the device housing so that the air fed into the conduit at the head end can flow out, as is required for a blown fiber installation. While the actuator is in its second, activated position, the fiber is fed into and through the tube.

In an embodiment, there is provided a system for use with a conduit having a first conduit end and a conduit second end, into which conduit a cable can be installed using a flow of air into the first conduit end, comprising a device of the invention.

In implementations of the system, the equipment at the head end, comprising in the main the blowing head and the air compressor, is configured to receive and to respond to the transmitted signal comprising the detected tones.

The operator can advantageously use the device at the remote end of the installation, and the head end apparatus together so that it can initially be determined that air is flowing to and from the correct remote end, and the fiber unit then installed into the conduit as the next step. By using this kit, the operator need not travel to the remote end, nor need there be a second operator located at the remote end for the purpose of detecting the arrival of the airflow.

In an embodiment, there is provided a method for use with a conduit having a first conduit end and a conduit second end, into which conduit a cable can be installed using a flow of air into the first conduit end, and to confirm that the air is flowing out of the from the second conduit end, the method comprising attaching a device of any one of claims 1 to 12 to the second conduit end, applying the flow of air into the first conduit end, causing the actuator of the device to move relative to the detector of the device, and causing an electrical property change detected by the detector.

By using this method, the operator can determine if the correct conduit has been selected, where there are a number of conduits to choose from, or otherwise to determine that the conduit into which air is introduced will emerge, and does indeed emerge, at the remote end of the conduit.

In an embodiment, this method further includes the detection of fiber arrival at the remote end of the installation.

BRIEF DESCRIPTION OF THE DRAWINGS

Embodiments will now be described, by way of example only, with reference to the accompanying drawings, in which.

DETAILED DESCRIPTION

Figure 1A:
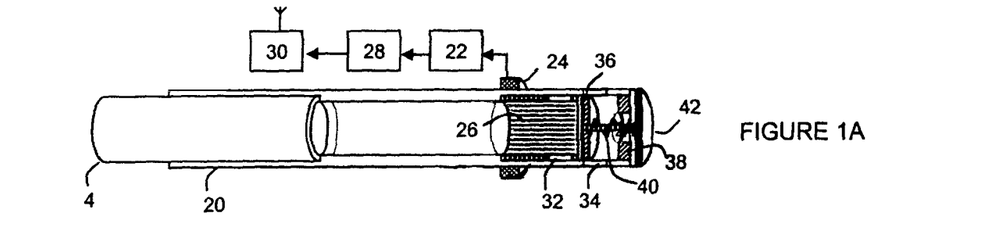
FIGS. 1A and 1B depict a device in use during airflow detection according to an embodiment.
Figure 1B:
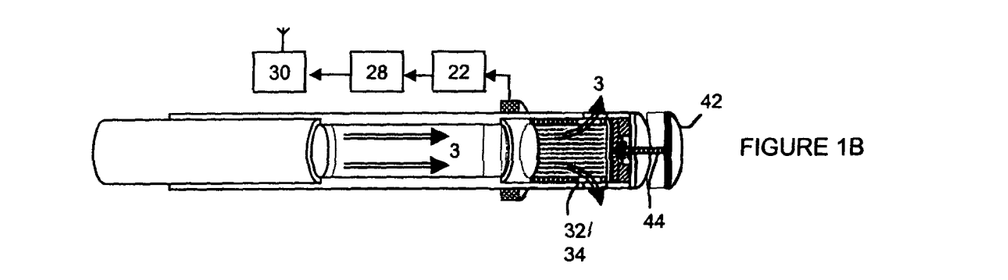

FIGS. 1A and 1B depict an embodiment based on detection of an electrical property change, in this example being an inductance change. It comprises a substantially cylindrical or tubular housing (20) which has one open end and one closed end. The open end is configured to connect with the mouth of the optical fiber tube at the remote end of the installation, e.g. in a friction fit. The housing is fabricated from a non-metallic material, such as an injection-molded plastic, which is relatively simple and cheap to manufacture.

A piston (26) is also generally tubular with one open end and one closed end, and is disposed substantially co-axially within the housing, where the piston. The open end of the piston faces the same direction as the open end of the housing. The piston is configured to slide along its longitudinal axis within the housing. It is fabricated from metal, or else includes metal elements, e.g. it can comprise an injection-molded plastic containing metal filings. An induction coil (24) capable of sensing the presence of a metallic object, is mounted on the external surface so that is surrounds the housing. The coil is part of a tunable oscillator circuit (22), which is connected to a signal processor (28) capable of detecting tones generated by the oscillator, which tones—and any tone changes—can be transmitted by a radio frequency (RF) transmitter (30). The induction coil (24) and the piston (26) are positioned relative to each other so that they may move in and out of proximity of each other, such that the presence of the metallic properties of the piston changes the electrical characteristics of the coil, primarily its induction, which in turn changes the properties of the oscillator, specifically the tuning, which changes the frequency of the tone it produces. In alternative embodiments the frequency of the tone produced by the oscillator may be unchanged by the proximity of the piston to the coil. In those embodiments the change in the electrical characteristics of the coil produced by the proximity of the piston to the coil can be designed to change the amplitude or the phase, or both, of the tone produced by the oscillator. In all of these embodiments the change in the frequency, amplitude or phase of the tone produced by the oscillator is the indicator that signifies the arrival of air and/or the fiber unit at the remote end of the conduit. This applies to all the descriptions below in which a change in frequency only of the oscillator tone is given as example.

The housing (20) and the piston (26) each include a set of air vents. The air vents of the piston (32) align with the air vents of the housing (34) when the piston is in a specific position within the housing.

In the space between the closed end of the piston and the closed end of the housing is an arrangement to hold the piston in one of two positions: the first "rest" position being that the metallic piston (26) is located proximate to the induction coil (24) as shown in FIG. 1A, and the second "activated" position being where the two sets of air vents (32/34) are in alignment as shown in FIG. 1B. The piston is configured to slide between these two positions within the housing. The arrangement comprises a spring (40) extending from the closed end of the housing, which holds the piston in the first rest position. The second activated position is obtained by the cooperation of a metal disc (36) and a magnet (38).

In the embodiment shown, the metal disc is disposed on the closed end of the piston and the magnet on the closed end of the housing although of course the locations of these two components may be reversed. Although the piston is made partially or even fully of metal, the metal disc may be required in practice to ensure that the attraction of the piston assembly to the magnet is sufficiently strong. As the purpose of this assembly is to hold the piston in the second activated position, it would be possible to use any suitable alternative that would achieve this end, e.g. a spring-loaded latch actuated by the travel of the piston.

A plunger rod (44) connected to the closed end of the piston is pushed outwardly of the device when the piston is in the activated position, and a button (42) located at the end of the rod allows for the piston to be re-set to the rest position by the operator pressing the same to disengage the magnet and the metal disc sufficiently for the spring to urge the piston back in the first, resting position.

The use of the device to sense a flow of air from the mouth of the conduit at the remote or far end of a blown fiber installation will now be described. At the start of the installation operation, the operator travels to the remote or destination end of the installation, and connects the above device to the mouth of the conduit from which it is hoped that the compressed air fed from the head end, will emerge. The device is set (or reset using the button (42)) so that it is in the first rest position, where the piston (26) is in proximity with, and actuates, the induction coil (24), and the air vents (34 and 36) are out of alignment, as shown in FIG. 1A. The oscillator circuit (22) thus outputs a tone of a specific frequency "A" indicative of the specific location, of the metallic piston in the rest position or state. This is transmitted by RF as a status signal indicate that the sensor is active and functioning, and that the piston is in the correct rest position, to the operator when he arrives at the head end of the installation, which may be a kilometer or more away. This provides assurance that the device of the invention is working before starting the installation operation.

The operator chooses a conduit opening to direct pressurized air from an air compressor into. At the start of the blown fiber installation, the air pressure in and along the conduit is at a steady state level and air flow is zero. If the air is directed into the correct conduit opening, air eventually flows through to the remote end of the conduit, and into the housing (20) of the device. Because the two sets of air vents (32 and 34) are out of alignment, the housing is substantially air-tight. The increase in air pressure (e.g. up to 10 bar) within the housing caused by the air flow, gradually exceeds the pushing force of the spring (40) and causes the piston to slide towards the second, activated position. During this, the proximity of the metal disc (36) to the magnet (38) located opposite ends to each other increases. When the magnetic attraction between these two components eventually exceeds the force of air pressure within the main section of the housing and the opposing force of the spring, the piston snaps to take the second activated position shown in FIG. 1B at which point the two components are magnetically coupled together.

In the activated position, the two sets of air vents (32 and 34) are in alignment so that the air flow into the housing exhausts to the atmosphere as depicted by the arrows in FIG. 1B, resulting in a reduction of the air pressure within the housing. The force opposing that of the spring is now removed and the force of the air flow through the housing is insufficient in itself to hold the piston in that location, but the magnet arrangement helps holds the piston in the activated position. At this stage, the steady air flow through the conduit essential to the blown fiber installation procedure, is attained.

In the travel in the metallic piston from the resting to the activated position, the piston moves out of the immediate range of the induction coil (24). This changes the frequency of the tone produced by the oscillator (22). Depending on design considerations, the tone will either increase or decrease to a new frequency "B" generated by the piston's location at the activated position. In practice the change in the frequency of the tone will be relatively rapid and abrupt because of the increasing magnetic pull causing the piston to eventually snap to the activated position. In any event, frequency "B" will be distinguishable from frequency "A". The new frequency is detected and a corresponding status signal is automatically transmitted to the operator at the head end via the radio channel or by other means. The operator can at that point be assured that compressed air is being fed into the correct conduit mouth at the head end.

Of course, if the operator did not feed the air down the correct conduit, none of the above will occur. In such a case, the operator will realize, from not receiving any signal from the remote end after a suitable time period, that something is amiss. He can then take appropriate steps e.g. selecting another conduit end to connect to the air compressor. He will at least be aware that the fiber unit should not be installed into the first-chosen tube.

The use of the device to further sense the arrival of a fiber unit fed into the mouth of the conduit at the remote or far end of a blown fiber installation will now be described with reference to FIGS. 2A and 2B.

First, a supply of fiber unit is prepared by crimping or otherwise crimping a slug or a bead (6) to the tip of one end, which protects the fragile glass fiber from damage. The bead typically has a rounded end which eases the fiber unit's progress through the conduit path. It is often made from, or includes, metal; brass is a suitable material in an embodiment as it does not rust.

After the operator at the head end receives confirmation by RF or by, e.g. a short message service text message that air is flowing from the desired destination conduit, a fiber unit (2) is fed into the same conduit (4) into which the compressed air is being fed.

Figure 2A:
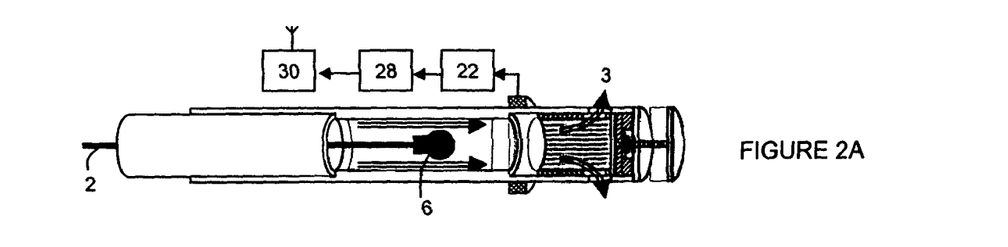
FIGS. 2A and 2B depict a device in use during cable arrival detection according to an embodiment.
Figure 2B:
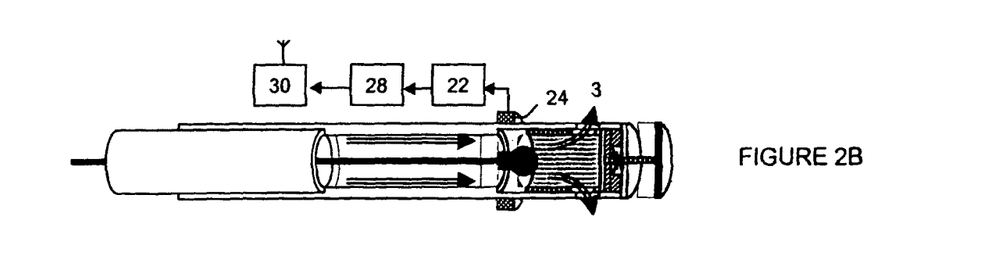

When the fiber unit (2) led by the metallic bead (6) advances out of the conduit opening at the remote end into the housing of the device as shown in FIGS. 2A and 2B, the electrical properties of the induction coil (24) change which causes the oscillator's tone to shift from frequency "B" to a new frequency "C". It is possible for the value of frequency "C" to be substantially the same as that for frequency "A" without affecting the operation of the sensor, as long as the oscillator tone (22) clearly and distinguishably changes when the bead signifying the fiber unit arrives within proximity of the induction coil.

Unlike the relatively abrupt frequency change pattern in the air-detection step described above against FIG. 1, the change from frequency "B" to frequency "C" in FIG. 2 is more gradual, and the frequency change peaks quickly and momentarily as the bead advances past the induction coil and embeds in the piston beyond the immediate vicinity of the coil. The frequency thus changes momentarily from frequency "B" to frequency "C" and then back to substantially "B" again. The signal processor (28) accommodates these different characteristics and delivers (30) an unambiguous status signal to the operator at the head end, who then knows that the fiber cable has arrived and that the installation is complete.

The blowing head can then be tuned off, either manually by the operator, or in a further embodiment the receipt of the status signal could be linked to the blowing head so that the blowing head can be automatically switched off on receipt of the signal as further discussed below with reference to FIG. 5. At this point, the operator travels back to the remote site to remove the device from the conduit ending, and to reset it by pushing the button (42) so that the piston within the housing returns to its rest position for the device's next use.

As the skilled person would be aware, the components of the device can be used in various combinations and can be substituted by various other components. Some exemplary embodiments will now be discussed.

Figure 3A:
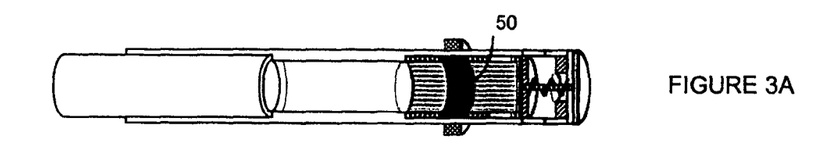
FIGS. 3A and 3B depict an alternative embodiment.
Figure 3B:
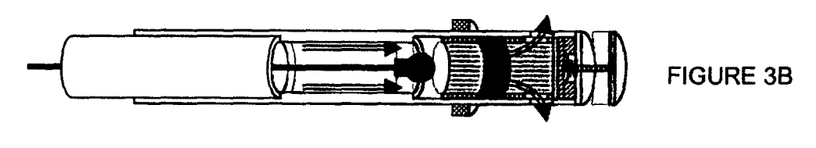
Figure 4A:
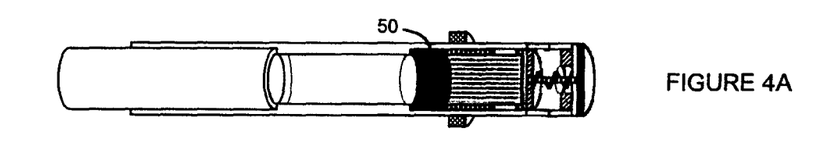
FIGS. 4A and 4B depict another alternative embodiment.
Figure 4B:
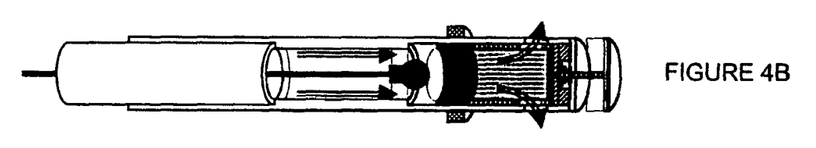

FIGS. 3 and 4 show embodiments in which only a portion of the piston comprises metal, as compared with the embodiment discussed with reference to FIGS. 1 and 2 where the whole piston consisted of, or included, metal. Specifically, the piston includes a band of metal, or metal constituents (50). The embodiments shown in FIGS. 3 and 4 are equally effective to cause a frequency change when the piston in each case is caused to slide to the activated position upon an increase in air pressure within the housing chamber: the metal band moves out of the immediate detection zone of the induction coil in the case of the device of, e.g. FIG. 3A, while the metal band moves into the immediate vicinity of the coil in the case of the device of FIG. 4. In the case of the device of FIG. 4, however, it should be noted that the persistent presence of the metal band in the immediate vicinity of the coil in the activated state may result in a smaller and less easily-detected frequency change upon arrival of the fiber unit, caused by the metal bead at the leading end of the fiber unit.

The skilled person would also realize that the band (50) and the induction coil (24) can be placed at various locations along the length of the housing, so as to obtain different results and effects. For example, an induction coil can be placed near the end of the device in the immediate proximity of the terminal location within the housing where the bead will rest, to provide a clear continuous signal to the operator that the fiber bead has arrived at the remote end of the installation. This could be a second or further coil in addition to a first which is located at the position shown in, e.g. FIG. 1. The plunger rod (44) arrangement and reset button (42) are optional to the operation of the device, and may not be needed in a disposable version of the device. The spring (40) can be replaced by any resilient/biasing component which urges the piston to the first resting position.

In an embodiment, the pushing force of the spring against the piston can be pre-selected so that the piston is caused to travel only when air pressure within the housing reaches a pre-determined level. In one embodiment, this air pressure level should approximate that of the air applied at the head end: by way of example, the applicants feed air compressed to 10 bar into the tube. This allows the operator to start the fiber installation process only when the desired air pressure level is attained within the conduit, as blown fiber may not propagate successfully through the tube if there is insufficient air flow therein. In further embodiments, the resilience level of the spring may be adjustable or selected, and can be used to measure air pressure levels within the housing during an installation.

As noted above, the detection of the presence or absence of the metallic piston and/or bead within the housing can be achieved by sensing or measuring changes in other electrical properties or characteristics of the detector, such as its capacitance, its Q factor, resistance, or the like.

As a further design consideration, the force of the spring in the activated position should be less than the magnetic force holding the piston in place. Furthermore, the coupling strength of the magnetic arrangement should be sufficiently robust to avoid the piston accidentally springing back to the resting position, yet allow for the device to be reset by an operator without too much difficulty after an installation.

In certain embodiments, the movement of the piston itself can be detected as signifying the presence of air and/or the fiber unit in the device. In such examples, the movement away from the first resting position can itself be sensed to indicate, e.g. an airflow within the housing. A subsequent movement (which could be in the same direction as the first movement away from the first position, or in the reverse or other direction) could be sensed as a further indication of, e.g. fiber unit arrival within the housing. For example, the piston could be urged away from the first rest position upon air arrival, and the bead of the fiber unit could push it to the second, further position indicating its presence in the housing.

Figure 5:
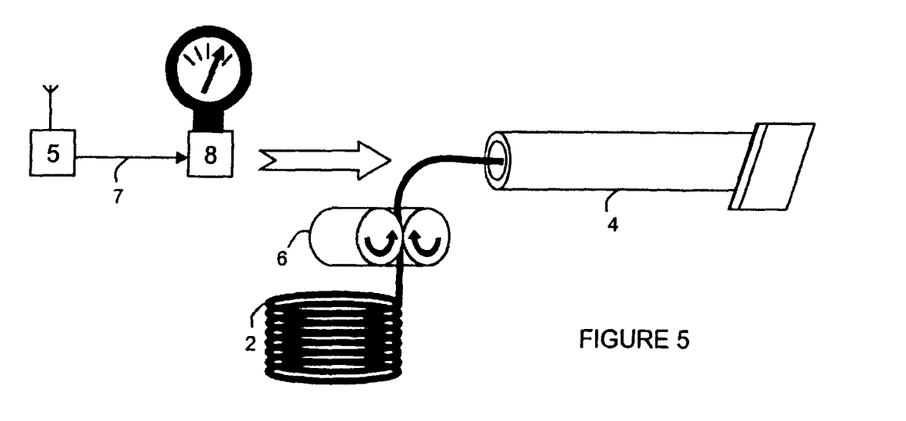
FIG. 5 depicts the main components of an apparatus used in a blown fiber installation at the head end according to an embodiment.

FIG. 5 depicts the main apparatus components located at the head end of the optical fiber conduit or tube, where the operator is located. There, he operates a blowing head which controls the forces propelling an optical fiber unit (2) into the conduit or tube (4), which forces comprise a pair of drive wheels (6) and a supply of pressurized air (8) typically from a compressor. The drive wheels mechanically drive the fiber unit into the tube, while the compressed air is fed into the conduit to create within it the laminar air flow which will bear the fiber unit along and through the tube.

The blowing head may be capable of detecting that the fiber unit is no longer progressing through the tube—which could be a result of the fiber arriving at the remote end, or else it is otherwise caught or stuck within the tube. In response, the blowing head stops the drive wheels from further pushing the fiber unit into the tube. The receipt (or non-receipt) of confirmation that the fiber bead has arrived at the remote end via the radio receiver (5) allows the operator to decide what to do next: to end the successful installation, or else to take remedial action.

In one embodiment, the head end apparatus (in the main, the blowing head and the air compressor) is configured to respond (7) to the receipt of a signal indicative of fiber arrival at the remote end, by terminating the installation session, e.g. by turning themselves off, or going into a standby mode. There is a particular synergy in doing so in the case of the blowing head, due to this component's already existing capability to sense lack of further progress of the fiber within the tube: receipt of the fiber arrival signal confirms the cause of the lack of fiber progress. Similarly, the apparatus at the head end could be configured to respond to the initial signal that air is flowing from the remote end conduit, by automatically starting the fiber installation process.

Figure 6:
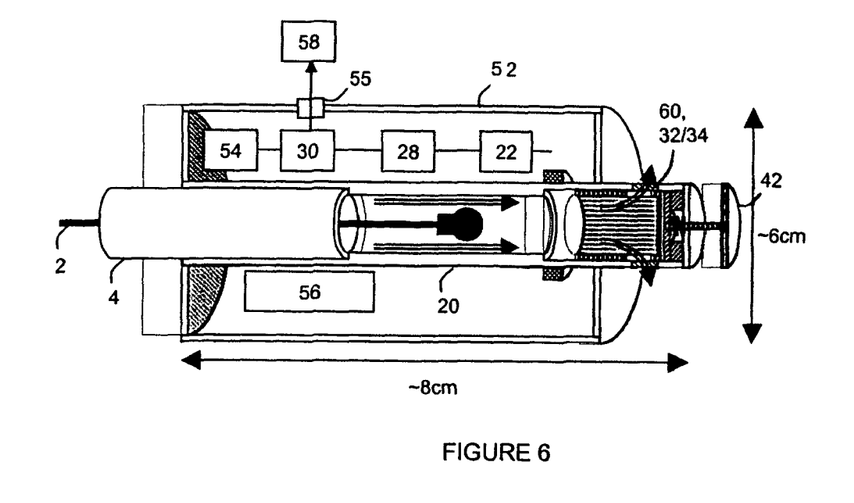
FIG. 6 depicts a device and its enclosure according to an embodiment.
Figure 7:
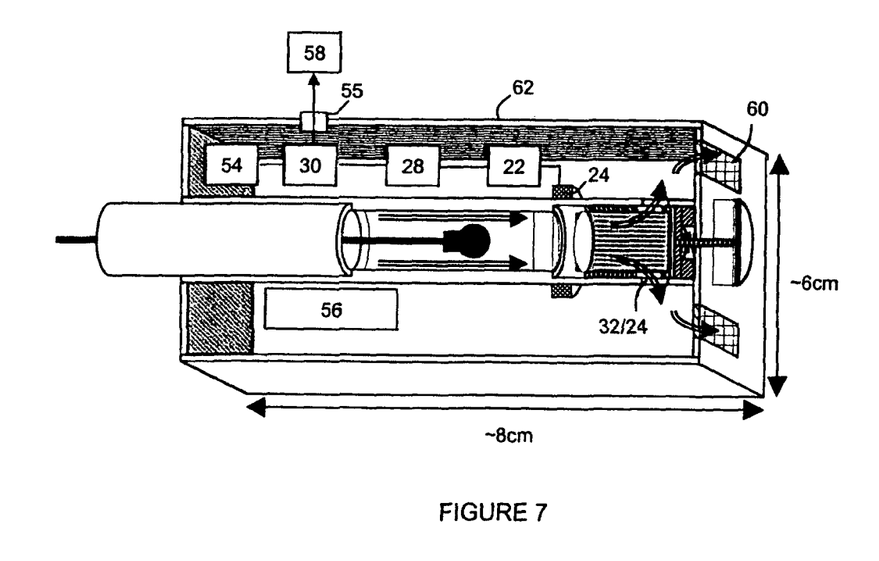
FIG. 7 depicts a device with an alternative enclosure according to an embodiment.

FIGS. 6 and 7 depict two embodiments of the full enclosure surrounding the device, which may be about 8 cm long for use with a conduit having an external diameter of typically 3 mm in the case of small-bore conduits, up to 15 mm and more for large bore conduits. In one embodiment the coupling flange fixed to the device housing may be adjustable to tightly fit the conduit in use, or the coupling flange may be removable from the housing whereupon the another flange size suitable for the conduit in use is selected for attachment to the housing. In either case the flange ensures mechanically robust and substantially airtight coupling between the housing (20) and the conduit (4).

In FIG. 6, the device comprises two injection-molded plastic sections: the inner tubular housing (20), and the outer enclosure (52). Fine gauze dust shields (60) are provided on the air vent openings (32 and 34) to prevent or discourage contamination of the interior of the device. The outer enclosure is configured to avoid the air vents so that the arriving air vents to atmosphere and allows essential air flow along the conduit. The reset button (42) is also located outside the outer enclosure. Once assembled, the only service-removable part is the battery cover protecting the dry cell battery (56) on the outer enclosure surface. Should it be found desirable to replace the dust shields, then they too could be made to be service-removable. A minimal number of service-removable parts is however advantageous for easy maintenance.

An internal antenna (54) used for transmitting signals about air and fiber arrival to the head end, may be incorporated within the enclosure, or alternatively an external antenna (55) could be used for greater range/gain in operational situations where radio reception may be impaired (e.g. down a manhole). In an embodiment, the fiber conduit at the remote end is long enough to extend the fiber conduit route to ground/surface level for the purposes of the installation process, in which case radio reception is improved and a reliable channel may be established with the head end operator. Should there be insufficient length of conduit, a bridging length of conduit can be temporarily attached for purposes of the installation.

FIG. 7 shows an alternative outer enclosure (62) consisting a simple injection-molded box. In this implementation, only the reset button (42) stands proud of the outer enclosure. All the other elements of the device can be enclosed, even the air vent openings (32 and 34), although the gauze dust shields (60) must be configured to allow for sufficient air flow through the conduit and out of the device for purposes of the blown fiber installation session.

The methods, devices, components and configurations described above and in the drawings are for ease of description only and not meant to restrict the invention to any particular embodiments. It will be apparent to the skilled person that various sequences and permutations on the methods and devices described are possible within the scope of this invention as disclosed; similarly the invention could be used in various similar scenarios and for various cable and conduit types and sizes. In particular, the apparatus and methods relating to air flow detection and the methods and apparatus relating to fiber arrival detection are depicted in this description to be used together in one embodiment. However, they will work independently of each other on their own, to realize the advantages of the respective inventions.

The invention claimed is:

1. A device for use with a conduit having a first conduit end and a conduit second end, into which conduit a cable can be installed using a flow of air into the first conduit end, the device being suitable for confirming that the air is flowing out from the second conduit end, the device comprising:
   a housing;
   means to enable connection of the device to the second conduit end;
   a detector arranged to detect an electrical property change; and
   an actuator for causing an electrical property change detectable by the detector, wherein in use, air flowing into the device causes the detector and the actuator to move relative to each other, causing an electrical property change detectable by the detector.

2. A device according to claim 1, wherein the detector comprises at least one of an induction coil or a capacitor being part of an oscillator, connected to a signal processor for detecting tones generated by the oscillator, the device further comprising a transmitter for transmitting a signal comprising the detected tones.

3. A device according to claim 1, wherein the actuator is arranged to move within the housing, and comprises a metallic element.

4. A device according to claim 1, further including holding means to hold the actuator in one of either a first position or a second position, wherein movement between the first position and the second position causes the electrical property change.

5. A device according to claim 4, wherein the holding means to hold the actuator in the first position comprises a spring urging against the actuator.

6. A device according to claim 5, wherein the holding means to hold the actuator in the second position comprises means causing compression of the spring.

7. A device according to claim 6, wherein the holding means comprises a magnet and a metal disc disposed opposite to each other.

8. A device according to claim 7, wherein in use, the air flowing into the device causes the magnet and the metal disc to move towards each other and then to be magnetically coupled together.

9. A device according to claim 4, further including an air vent through which in use, the air flows when the actuator is held in the second position.

10. A device according to claim 9, further including means to return the actuator to the first position from the second position.

11. A device according to claim 4, wherein the actuator is detected by the detector when the actuator is held in the first position.

12. A device according to claim 1, wherein the device is configured to confirm that the cable has arrived at the second conduit end, wherein the detector is arranged to detect a further inductance change caused by a detected presence of a bead including a metallic component connected to a fiber unit.

13. A device for use with a conduit having a first conduit end and a conduit second end, into which conduit a cable can be installed using a flow of air into the first conduit end, the device being suitable for confirming that the air is flowing out from the second conduit end, the device comprising:
   a housing;
   means to enable connection of the device to the second conduit end;
   a piston moveably located within the housing; and
   a detector for detecting a change in a position of the piston, wherein in use, air flowing into the device causes a change in the position of the piston within the housing which is detected by the detector.

14. A device according to claim 13, wherein the device is configured to confirm that the cable has arrived at the second conduit end, wherein the detector is arranged to detect a further change in the position of the piston caused by travel of a bead connected to a fiber unit within the housing.

15. A system for use with a conduit having a first conduit end and a conduit second end, into which conduit a cable can be installed using a flow of air into the first conduit end, comprising:
   a device for confirming that air is flowing out from the second conduit end, the device comprising
   a housing;
   means to enable connection of the device to the second conduit end;
   a detector arranged to detect an electrical property change; and
   an actuator for causing an electrical property change detectable by the detector, wherein in use, air flowing into the device causes the detector and the actuator to move relative to each other, causing an electrical property change detectable by the detector.

16. A system according to claim 15, wherein an apparatus at the first conduit end is configured to receive and to automatically respond to the detected change.

17. A method for use with a conduit having a first conduit end and a conduit second end, into which conduit a cable can be installed using a flow of air into the first conduit end, and to confirm that the air is flowing out from the second conduit end, the method comprising:
   attaching a device to the second conduit end, the device comprising a detector and an actuator for causing an electrical property change detectable by the detector;
   applying the flow of air into the first conduit end, causing the actuator of the device to move relative to the detector of the device; and
   causing an electrical property change detected by the detector.

18. A method for use with a conduit having a first conduit end and a conduit second end, into which conduit a cable can be installed using a flow of air into the first conduit end, and to confirm that the air is flowing out from the second conduit end, the method comprising:
   attaching a device to the second conduit end, the device comprising a housing, a piston moveably located within the housing, and a detector;
   applying the flow of air into the first conduit end; and
   detecting with the detector a change in the position of the piston within the housing caused by the flow of air.

19. A method according to claim 18, further comprising transmitting a signal based on the detected change.

20. A method according to claim 17, wherein to confirm that the cable has arrived at the second conduit end, the method further comprises:
   connecting a bead to an end of the cable;
   installing the cable into the first conduit end; and
   causing a further electrical property change detected by the detector.

21. A method according to claim 18, wherein to confirm that the cable has arrived at the second conduit end, the method further comprises:
    connecting a bead to an end of the cable;
    installing the cable into the first conduit end; and
    causing a further change in position of the piston within the housing detected by the detector.

22. A method according to claim 20, further comprising:
    transmitting a signal comprising the further detected change to an apparatus located at the first conduit end; and
    causing the apparatus at the first conduit end to automatically respond to the transmitted signal.

23. A method according to claim 17, further comprising transmitting a signal based on a detected change.

24. A method according to claim 21, further comprising:
    transmitting a signal comprising the further detected change to an apparatus located at the first conduit end; and
    causing the apparatus at the first conduit end to automatically respond to the transmitted signal.

* * * * *